(12) United States Patent
Li et al.

(10) Patent No.: US 12,288,238 B2
(45) Date of Patent: Apr. 29, 2025

(54) COMPLEMENTARY ITEM RECOMMENDATION SYSTEM

(71) Applicant: eBay Inc., San Jose, CA (US)

(72) Inventors: Shuya Li, Shanghai (CN); Yi Yu, Shanghai (CN); Yuyangzi Fu, Nantong (CN)

(73) Assignee: eBay Inc., San Jose, CA (US)

( * ) Notice: Subject to any disclaimer, the term of this patent is extended or adjusted under 35 U.S.C. 154(b) by 280 days.

(21) Appl. No.: 17/830,641

(22) Filed: Jun. 2, 2022

(65) Prior Publication Data

US 2023/0394549 A1 Dec. 7, 2023

(51) Int. Cl.
*G06Q 30/06* (2023.01)
*G06F 16/9032* (2019.01)
*G06F 16/9535* (2019.01)
*G06Q 30/0601* (2023.01)

(52) U.S. Cl.
CPC ... *G06Q 30/0631* (2013.01); *G06F 16/90328* (2019.01); *G06F 16/9535* (2019.01)

(58) Field of Classification Search
CPC .................................................. G06Q 30/0631
USPC ....................................................... 705/26.7
See application file for complete search history.

(56) References Cited

U.S. PATENT DOCUMENTS

| | | | |
|---|---|---|---|
| 11,055,557 | B2 | 7/2021 | Chatterjee et al. |
| 11,127,074 | B2 | 9/2021 | Ghadar et al. |
| 11,132,391 | B2 | 9/2021 | Chittar et al. |
| 2009/0006365 | A1 * | 1/2009 | Liu ...................... G06F 16/951 707/999.005 |

(Continued)

FOREIGN PATENT DOCUMENTS

| | | | | |
|---|---|---|---|---|
| EP | 3321855 | A1 * | 5/2018 | ........ G06F 16/24578 |
| WO | WO-2021243465 | A1 * | 12/2021 | ........ G06F 16/90335 |

OTHER PUBLICATIONS

L Chen, F Yang, H Yang; "Image-based product recommendation system with convolutional neural networks"; 2017• cs231n.stanford. ed; retrieved from Google on May 1, 2024. Available: http://cs231n. stanford.edu/reports/2017/pdfs/105.pdf, PDF pp. 1-7 (Year:2017) (Year: 2017).*

(Continued)

*Primary Examiner* — Yogesh C Garg
(74) *Attorney, Agent, or Firm* — Shook Hardy & Bacon LLP

(57) ABSTRACT

A recommendation system leverages multi-target search to provide item listing recommendations and/or query suggestions. For a given input image with multiple objects, multi-target search uses object detection to detect each object, and stores complementary object data associating each object from the image. Additionally, a search of an item listing datastore is performed using each object from the image as a search query. Based on item listings returned as search results, complementary item listings data associating item listings is stored. In some configurations, the complementary item listings data is also used to train a machine learning model to predict complementary item listings for a given item listing. When an input item listing is received, item listing recommendations and/or query suggestions are determined for the input item listing using the complementary object data, the complementary item listing data, and/or the machine learning model.

17 Claims, 9 Drawing Sheets

(56) References Cited

U.S. PATENT DOCUMENTS

| | | | |
|---|---|---|---|
| 2012/0150854 A1* | 6/2012 | Song | G06F 16/9558 707/E17.119 |
| 2012/0191531 A1* | 7/2012 | You | G06F 16/958 705/14.42 |
| 2013/0129142 A1* | 5/2013 | Miranda-Steiner | G06F 16/587 382/103 |
| 2015/0142606 A1* | 5/2015 | Hafeez | G06Q 30/0625 705/26.62 |
| 2017/0255985 A1* | 9/2017 | Acott | G06Q 30/0631 |
| 2019/0087631 A1* | 3/2019 | Lodewyckx | G06T 15/005 |
| 2019/0102601 A1* | 4/2019 | Karpas | G06V 20/64 |
| 2019/0303985 A1 | 10/2019 | Wouk | |
| 2019/0318405 A1* | 10/2019 | Hu | G06V 20/00 |
| 2019/0370879 A1* | 12/2019 | Bhattacharjee | G06N 3/045 |
| 2021/0133850 A1 | 5/2021 | Ayush et al. | |
| 2021/0150611 A1 | 5/2021 | Morin et al. | |

OTHER PUBLICATIONS

Abstract of the article cited in "U" above: L Chen, F Yang, H Yang; "Image-based product recommendation system with convolutional neural networks"; 2017•cs231n.stanford.ed; retrieved from Google on May 1, 2024. (Year: 2017).*

* cited by examiner

COMPLEMENTARY ITEM RECOMMENDATION SYSTEM

BACKGROUND

Search engines facilitate quickly finding items in electronic databases, such as, for instance, databases of items. Search engines receive search queries and provide search results for items that are responsive to the search queries. For a given search query, a search engine can process the search query, user data, contextual data, and/or other inputs to identify the most relevant items for the particular search. Search results for identified items can be presented on a user device in several different forms, for instance, on a search results user interface.

Recommender systems are one form of search in which items are recommended to a user. Such recommender systems have become ubiquitous and crucial for content discovery on various platforms like online retail, music, image search, and video streaming. Most recommendation systems focus on recommending similar items. For instance, if a user is viewing a sofa, a conventional recommendation system will recommend similar sofas. In many situations, however, users are searching for complimentary items. For instance, given a sofa being viewed, the user may wish to access complementary items, such as matching tables, lamps, chairs, or carpets for the sofa. While some recommendation systems can recommend complementary items, such systems are not robust, particularly in the case when there is a large number of item listings available.

SUMMARY

Embodiments of the present technology relate to, among other things, a recommendation system that leverages multi-target search to provide item listing recommendations and/or query suggestions. At index time, the recommendation system generates data that associates complementary objects and complementary item listings based on objects in an image. An object is an item in an image that doesn't necessarily have a corresponding item listing; while an item listing is a particular listing of an item available on a listing platform. For a given input image with multiple objects, multi-target search uses object detection to detect each object, and stores complementary object data associating each object from the image. Additionally, a search of an item listing datastore is performed using each object from the image as a search query. Based on item listings returned as search results, complementary item listings data associating item listings is stored. In some configurations, the complementary item listings data is also used to train a machine learning model to predict complementary item listings for a given item listing. At run time, an input item listing is received. Item listing recommendations and/or query suggestions are determined for the input item listing using the complementary object data, the complementary item listing data, and/or the machine learning model.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Overview

Figure 1:
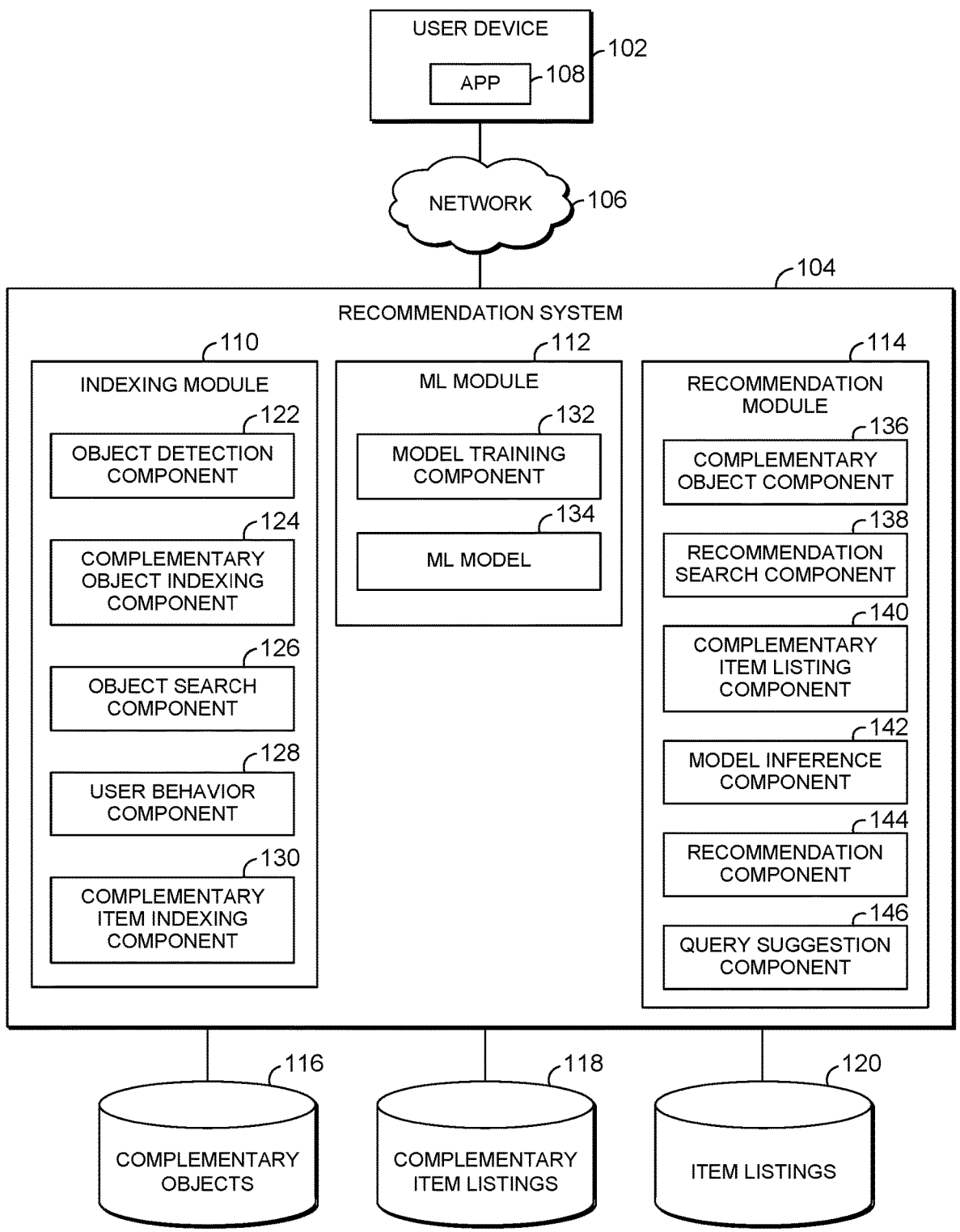
FIG. 1 is a block diagram illustrating an exemplary system in accordance with some implementations of the present disclosure.

While search/recommendation systems are incredibly useful tools for locating items, shortcomings in existing search technologies often result in the consumption of an unnecessary quantity of computing resources (e.g., I/O costs, network packet generation costs, throughput, memory consumption, etc.). When performing searches, in some instances, users may be seeking complementary items. For instance, when searching for a sofa, a user may wish to also access complementary items for the sofa, such as chairs, carpets, and tables. However, it is difficult for users to find complementary items, especially when dealing with search systems that have access to a large number of items. To retrieve complementary items, users often have to submit multiple queries before finding desired items. For example, a user may issue a first query to a search engine that returns a set of search results for a given item. The user may browse the search results and select certain search results to access the corresponding items. Selection of items causes retrieval of the items from various content sources. Additionally, in some cases, applications supporting those items are launched in order to render the items. The user must then search for complementary items by issuing additional queries and selecting certain search results until the user finally accesses a desired complementary item. This process may be repeated for each of the complementary items the user is seeking.

These repetitive inputs result in increased computing resource consumption, among other things. For instance, repetitive user queries result in packet generation costs that adversely affect computer network communications. Each time a user issues a query, the contents or payload of the query is typically supplemented with header information or other metadata within a packet in TCP/IP and other protocol networks. Accordingly, when this functionality is multiplied by all the inputs needed to obtain the desired data, there are throughput and latency costs by repetitively generating this metadata and sending it over a computer network. In some instances, these repetitive inputs (e.g., repetitive clicks, selections, or queries) increase storage device I/O (e.g., excess physical read/write head movements on non-volatile disk) because each time a user inputs unnecessary information, such as inputting several queries, the computing system often has to reach out to the storage device to perform a read or write operation, which is time consuming, error prone, and can eventually wear on components, such as a read/write head. Further, if users repetitively issue queries, it is expensive because processing queries consumes a lot of computing resources. For example, for some search engines, a query execution plan may need to be calculated each time a query is issued, which requires a search system to find the least expensive query execution plan to fully execute the query. This decreases throughput and increases network latency, and can waste valuable time.

Aspects of the technology described herein improve the functioning of the computer itself in light of these shortcomings in existing search technologies by providing a solution that enables a recommendation system to leverage multi-target search to identify complementary objects and/or complementary item listings for one or more item listings a user has interacted with. The complementary objects and/or complementary item listings may be used to provide item listing recommendations and/or query suggestions to facilitate the search process in efficiently providing item listings of interest.

In particular, some aspects are directed to a recommendation system that leverages information from multi-target search to facilitate the identification of complementary objects and/or complementary item listings. As used herein, multi-target search refers to image-based search in which an image with multiple objects is submitted for searching multiple targets—i.e., each object in the image is a separate target for search. For instance, an image may be provided that includes a sofa, a chair, and a coffee table. Each of the sofa, chair, and coffee table comprises an object for search.

In accordance with some aspects of the technology described herein, multi-target search performed on images is used to generate complementary object data and complementary item listing data that can be used to generate item listing recommendations and/or query suggestions. As used herein, an object is an item in an image that doesn't necessarily have a corresponding item listing available on a listing platform, while an item listing is a particular listing of an item on a listing platform. For a given input image with multiple objects, the multi-target search uses object detection to detect each object in the input image, and stores, in a complementary objects database, complementary object data associating each object from the image. Additionally, a search is performed on an item listing datastore using each object from the input image as a search query. Based on item listings returned as search results, complementary item data associating item listings is stored in a complementary items database. In some cases, the complementary item data is based at least in part on user interactions (e.g., view, purchases, etc.) with item listings in the search results. In some configurations, the complementary item data is also used to train a machine learning model to predict complementary item listings for a given item listing.

The complementary object data, complementary item listing data, and/or machine learning model can be used to provide recommendations. In some aspects, the recommendations can be item listing recommendations provided to a potential buyer based on, for instance, a currently viewed item listing and/or item listings the potential buyer has viewed or otherwise interacted with. In some aspects, the recommendations can be item listing recommendations provided to a seller based on an item listing submitted by the seller. In further aspects, the recommendations can be query suggestions provided to a user performing a search for item listings on a listing platform.

In the case of item listings recommendations, one or more input item listings are received. Using an object image from an input item listing, complementary objects can be identified using the complementary object data, and a first set of complementary item listings may be identified from an item listings datastore based on the complementary objects. A second set of complementary item listings can be identified for the input item listing using the complementary item listing data. A third set of complementary item listings can be identified by providing the input item listing to a machine learning model trained on the complementary item listing data. Item listing recommendations are provided based on the first set of complementary item listings, the second set of complementary item listings, and/or the third set of complementary item listings.

In the case of query suggestions, one or more input item listings are received. Using an object image from an input item listing, complementary objects can identified using the complementary object data, and queries are generated based on the complementary objects. Queries can also be generated from complementary item listings for an input item listing using complementary item listing data and/or a machine learning model generated from the complementary item listing data. Query suggestions can be provided to the user based on the queries from the complementary object data, the complementary item listing data, and/or the machine learning model.

Aspects of the technology described herein provide a number of improvements over existing search/recommendation technologies. For instance, computing resource consumption is improved relative to existing technologies. In particular, providing complementary item listings and/or query suggestions based on complementary objects/item listings identified from multi-target search allows the system to more efficiently provide relevant complementary item listings. This eliminates (or at least reduces) the repetitive user queries, search result selections, and rendering of items because recommendations comprise complementary item listings the user is seeking and/or the query suggestions allow users to identify search results for complementary item listings without the need to continuously input various search queries to access search results for complementary item listings. Accordingly, aspects of the technology described herein decrease computing resource consumption, such as packet generation costs. For instance, a user query (e.g., an HTTP request), would only need to traverse a computer network once (or fewer times relative to existing technologies). Specifically, the contents or payload of the user query is supplemented with header information or other metadata within a packet in TCP/IP and other protocol networks once for the initial user query. Such packet for a user query is only sent over the network once or fewer times. Thus, there is no repetitive generation of metadata and continuous sending of packets over a computer network.

In like manner, aspects of the technology described herein improve storage device or disk I/O and query execution functionality, as they only need to go out to disk a single time (or fewer times relative to existing search technologies). As described above, the inadequacy of existing search technologies results in repetitive user queries, search result selections, and item renderings. This causes multiple traversals to disk. In contrast, aspects described herein reduce storage device I/O because the user provides only minimal inputs and so the computing system does not have to reach out to the storage device as often to perform a read or write operation. For example, the search engine can respond with search results that satisfy the user intent from a single user query (or few queries relative to existing technology). Accordingly, there is not as much wear on components, such as a read/write head, because disk I/O is substantially reduced.

Various configurations also improve query execution resource savings. Specifically, for example, the search system calculates a query execution plan on fewer queries relative to existing search technologies. This increases throughput and decreases network latency because aspects of the technology described herein do not have to repetitively calculate query execution plans because fewer user queries need to be executed, unlike existing search technologies.

Example System for Complementary Item Recommendation

With reference now to the drawings, FIG. 1 is a block diagram illustrating an exemplary system 100 for providing complementary item recommendations in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102 and a recommendation system 104. Each of the user device 102 and recommendation system 104 shown in FIG. 1 can comprise one or more computer devices, such as the computing device 900 of FIG. 9, discussed below. As shown in FIG. 1, the user device 102 and the recommendation system 104 can communicate via a network 106, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present technology. Each may comprise a single device or multiple devices cooperating in a distributed environment. For instance, the recommendation system 104 could be provided by multiple server devices collectively providing the functionality of the recommendation system 104 as described herein. Additionally, other components not shown may also be included within the network environment.

The user device 102 can be a client device on the client-side of operating environment 100, while the recommendation system 104 can be on the server-side of operating environment 100. The recommendation system 104 can comprise server-side software designed to work in conjunction with client-side software on the user device 102 so as to implement any combination of the features and functionalities discussed in the present disclosure. For instance, the user device 102 can include an application 108 for interacting with the recommendation system 104. The application 108 can be, for instance, a web browser or a dedicated application for providing functions, such as those described herein. This division of operating environment 100 is provided to illustrate one example of a suitable environment, and there is no requirement for each implementation that any combination of the user device 102 and the recommendation system 104 remain as separate entities. While the operating environment 100 illustrates a configuration in a networked environment with a separate user device and search system, it should be understood that other configurations can be employed in which components are combined. For instance, in some configurations, a user device may also provide search/recommendation capabilities.

The user device 102 may comprise any type of computing device capable of use by a user. For example, in one aspect, the user device may be the type of computing device 900 described in relation to FIG. 9 herein. By way of example and not limitation, the user device 102 may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device where notifications can be presented. A user may be associated with the user device 102 and may interact with the recommendation system 104 via the user device 102.

The recommendation system 104 may be part of a listing platform. Examples of listing platforms include e-commerce platforms, in which listed products or services are available for purchase by a user of a client device upon navigation to the platforms. Other examples of listing platforms include rental platforms listing various items for rent (e.g., equipment, tools, real estate, vehicles, contract employees) and media platforms listing digital content items (e.g., content for download).

The functionality of a listing platform includes provision of interfaces enabling surfacing of item listings for items to users of the listing platform. Item listings for items available for sale/rent via the listing platform are stored by the item listings datastore 120. Each item listing may include a description relating to the item comprising one or more of a price in a currency, reviews, images of the item, shipment options, a rating, a condition of the item, a size of the item, a color of the item, etc. In aspects, the item is associated with one or more categories including meta-categories and leaf categories. For example, the meta-categories are each divisible into subcategories (or branch categories), whereas leaf categories are not divisible.

At a high level, the recommendation system 104 can identify complementary item listings for one or more input item listings and provide recommendations based on the complementary item listings. In some configurations, the recommendations comprise item listing recommendations. For instance, when a potential buyer selects to view a page for an item listing, the recommendation system 104 identifies complementary items listings for the selected item listing and presents those complementary item listings as item listing recommendations on the page of the item listing. In other instances, the recommendation system 104 uses information regarding historical user interactions with multiple item listings by a potential buyer to select complementary item listings to present as item listing recommendations, for instance, on a homepage or other location, when the potential buyer accesses the listing platform. In further configurations, the recommendation 104 identifies complementary item listings for a given item listing and presents the complementary item listings as item listings recommendations to the seller who submitted the item listing. For instance, the seller could bundle the complementary item listings together or the seller could select to present some of the complementary item listings as item listing recommendations on the page for the item listing. In still further instances, the recommendation system 104 uses complementary item listings to provide query suggestions to a potential buyer, where the complementary item listings are based on the potential buyer's interactions with one or more item listings.

As shown in FIG. 1, the recommendation system 104 includes an indexing module 110, machine learning module 112, recommendation module 114, complementary objects datastore 116, complementary item listings datastore 118, and item listings datastore 120. While the system 100 shows three separate datastores 116, 118, 120, it should be understood that information from the datastores 116, 118, 120 described herein may be combined or distributed among any number of storage repositories.

The components of the recommendation system 104 may be in addition to other components that provide further additional functions beyond the features described herein. The recommendation system 104 can be implemented using one or more server devices, one or more platforms with corresponding application programming interfaces, cloud infrastructure, and the like. While the recommendation system 104 is shown separate from the user device 102 in the configuration of FIG. 1, it should be understood that in other configurations, some or all of the functions of the recommendation system 104 can be provided on the user device 102.

In one aspect, the functions performed by components of the recommendation system 104 are associated with one or more personal assistant applications, services, or routines. In particular, such applications, services, or routines may operate on one or more user devices, servers, may be distributed across one or more user devices and servers, or be implemented in the cloud. Moreover, in some aspects, these components of the recommendation system 104 may be distributed across a network, including one or more servers and client devices, in the cloud, and/or may reside on a user device. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

The indexing module 110 of the recommendation system 104 operates to build the complementary objects datastore 116 and the complementary item listings datastore 118, which may then be used by the recommendation module 114 to identify complementary items as will be described in further detail below. As shown in FIG. 1, the indexing module 110 includes an object detection component 122, complementary object indexing component 124, object search component 126, user behavior component 128, and complementary item indexing component 130.

Generally, the indexing module 110 leverages multi-target search on images with multiple objects to identify relationships among objects in each image and relationships among item listings based on the object relationships. Given an image with multiple objects, the object detection component 122 performs object detection on the image to detect each object in the image. Any of a number of objection detection technologies can be employed by the object detection component 122 to identify each object in the image. In some configurations, the object detection component 122 may also classify each object to provide a label for each object. For instance, if the image contains a model wearing a dress and holding a handbag, the object detection component 122 may identify the dress and handbag as separate objects and label each accordingly—i.e., an image portion containing the dress may be labeled "dress" while an image portion containing the handbag may be labeled "handbag".

The complementary object indexing component 124 stores information in the complementary objects datastore 116 based on the objects detected in an image by the image detection component 112. The information generally associates objects identified from a given image as complementary objects. For instance, in the example in which an image is processed to identify a dress and handbag, the complementary object indexing component 124 stores information associating the dress and handbag as complementary objects.

The complementary objects datastore 116 can store different types of representations of each object. In some instances, the complementary objects datastore 116 stores an entire image for each object. In some instances, the complementary objects datastore 116 stores image portions corresponding with each object from an image. For instance, for the example input image with a dress and handbag, an image portion containing the dress could be stored for the dress and another image portion containing the handbag could be stored for the handbag. In other instances, a vector representation of each object is generated and stored. It should be understand that these object representations are provided by way of example only and not limitation. Other types of object representations can be stored by the complementary objects datastore 116.

As can be understood, the object detection component 122 can process multiple images, and the complementary object indexing component 124 can store information associating objects for each image in the complementary objects datastore 116. In this way, the complementary objects datastore 116 stores many different associations between objects with an association between two objects being based on the two objects appearing in the same image.

In addition to identifying and indexing information regarding associations between objects in images, the indexing module 110 identifies and stores information regarding associations between item listings based on objects from images processed by the multi-target search. More particularly, after objects are identified from an image by the object detection component 122, the object search component 126 performs a search to identify, from the item listing datastore 120, item listings for each object.

For a given object from an image, the object search component 126 may perform a search to identify item listings with objects similar to the given object. This may comprise, at least in part, an image-based search in which objects from item listings that are visually similar to the given object are identified. However, other information such as text and metadata may be used in conjunction with the image of the given object. For instance, if the given object was labeled by the object detection component 122, the label can be used by the object search component 126 to assist in identifying item listings.

The user behavior component 128 tracks user interactions with item listings returned as search results for objects from an input image for multi-target search. For instance, a user may provide an input image to the system to perform a multi-target search based on objects in the input image. Objects in the image are identified by the object detection component 122 and those objects are then used by the object search component 126 to identify item listings that are returned to the user as search results that include item listings for each of the objects in the input image. For instance, in the case in which the input image for multi-target search from a user comprises a model wearing a dress and holding a handbag, the search results may include item listings for dresses and handbags. Any of a number of different user interactions with those search results may be tracked by the user behavior component, such as for instance, selections ("clicks") of item listings, length of time viewing a selected item listing, adding an item listing to a watch/wish list, sharing an item listing with another user, adding an item from an item listing to a cart, and purchasing an item for an item listing, to name a few.

Based on the search results and/or user behavior information associated with the search results, the complementary item indexing component 130 stores information associating item listings in the complementary item listings data store 118. The information associating two item listings identifies those as complementary item listings. For instance, in the example in which an input image includes two objects, a dress and a handbag, a search would return item listings for the dress and item listings for the handbag. The complementary item indexing component 130 could store, in the complementary item listings datastore 118, information associating dress item listings from the search results with handbag item listings to identify those as complementary item listings. In some configurations, information associating item listings may be stored based on the item listings being returned for objects in the same image. In other configurations, information associating item listings may be stored based on the user behavior information tracked by the user behavior component 128. For instance, the user behavior information may be used to identify user interest in two item listings such that the two item listings should be considered to be complementary item listings. In some instances, a threshold level of user interaction with two item listings may be identified, and the two item listings identified as complementary item listings based on the threshold level of user interaction being met. Any and all such variations are contemplated to be within the scope of the technology described herein.

In some configurations, such as that shown in FIG. 1, the recommendation system 104 also includes a machine learning module 112. The machine learning module 112 includes a model training component 132. Given user behavior information associated with various item listings collected by the user behavior component 128, the model training component 132 trains a machine learning model 134 to predict complementary item listings given a particular item listing.

The machine learning module 112 may use any of a variety of technologies, such as collaborative filtering and neural networks. Different machine learning technologies are trained differently. The following example is for a neural network, but aspects of the technology are not limited to use with a neural network. As used herein, a neural network comprises at least three operational layers, although a neural network may include many more than three layers (i.e., a deep neural network). The three layers can include an input layer, a hidden layer, and an output layer. Each layer comprises neurons. Different types of layers and networks connect neurons in different ways. Neurons have weights, an activation function that defines the output of the neuron given an input (including the weights), and an output. The weights are the adjustable parameters that cause a network to produce a correct output.

Training is used to fit the machine learning model output to the training data. In this case, the training data comprises user behavior information regarding user interactions with item listings in search results from multi-target searches. Given this training data, the machine learning model 134 is trained by the model training component 132 to predict complementary item listings for given item listings. In particular, weights associated with each neuron can be updated through training. Originally, the machine learning model 134 can comprise random weight values that are adjusted during training. In one aspect, the machine learning model 134 is trained using backpropagation. The backpropagation process comprises a forward pass, a loss function, a backward pass, and a weight update. This process is repeated using the training data. The goal is to update the weights of each neuron (or other model component) to cause the machine learning model 134 to produce an output that selects item listings that are complementary to input item listings. Once trained, the weight associated with a given neuron can remain fixed. The other data passing between neurons can change in response to a given input (e.g., an input item listing). Retraining the network with additional training data can update one or more weights in one or more neurons.

Figure 2:
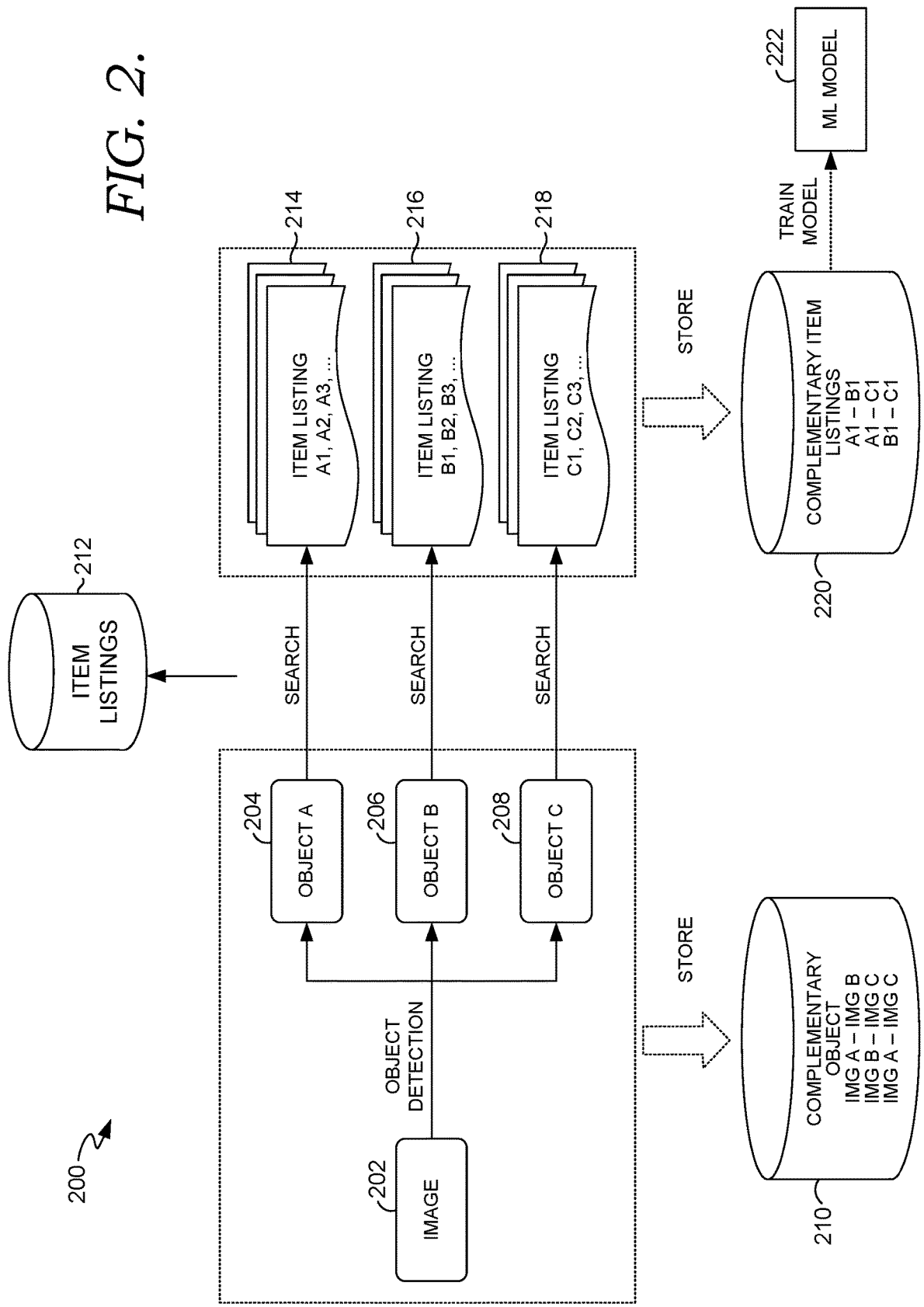
FIG. 2 is a block diagram showing an example process of detecting objects from multi-target search on an input image and storing complementary object information and complementary item listing information based on the detected objects in accordance with some implementations of the present disclosure.

FIG. 2 provides a block diagram illustrating a process 200 of detecting objects from multi-target search on an input image and storing complementary object information and complementary item listing information based on the detected objects. It should be understood that the process shown in FIG. 2 can be performed on any number of images to generate complementary object information and complementary item listing information for various objects for the collection of images.

As shown in FIG. 2, object detection is performed on an image 202 to identify three objects: object A 204, object B 206, and object C 208. For instance, the image 202 may be a picture of a room with a sofa, chair, and coffee table, each of which are identified by the object detection. Information associating the three objects 204, 206, 208 are stored in the complementary objects datastore 210. For instance, an image portion containing object A ("IMG A") could be stored in association with an image portion containing object B ("IMG B"), an image portion containing object B ("IMG B") could be stored in association with an image portion containing object C ("IMG C"), and an image portion containing object A ("IMG A") could be stored in association with an image portion containing object C ("IMG C").

A search on the item listings data store 212 is also performed for each of object A 204, object C 206, and object C 208. In particular, a search using object A 204 returns search results 214 with item listings A1, A2, A3, etc.; a search using object B 206 returns search results 216 with item listings B1, B2, B3, etc.; and a search using object C 208 returns search results 218 with item listings C1, C2, C3, etc. For instance, in the example in which object A 204 is a sofa, object B 206 is a chair, and object C 208 is a coffee table, the search results 214 comprise item listings for sofas similar to the object A 204, the search results 216 comprise item listings for chairs similar to the object B 206, and the search results 218 comprise item listings for coffee tables similar to the object C 208. Information associating item listings from the search results 214, 216, 218 is stored in the complementary item listings datastore 220. For instance, information associating item listings of different types can be associated as being complementary. As an example to illustrate, item listing A1 for a first sofa can be associated with item listing B1 for a first chair, item listing A1 for the first sofa can be associated with item listing C1 for a first coffee table, item listing B1 for the first chair can be associated with item listing C1 for the first coffee table, etc. As noted previously, in some instances, associations between item listings may be based on the item listings appearing in search results for objects from the same image (i.e., image 202 here). In some instances, associations between item listings may be based on user behavior information associated with the search results. For instance, associations may be based on a user selecting particular item listings from the search results or performing other interactions with certain item listings in the search results, such as, viewing item listings for a certain period of time, adding item listings to a watch/wish list, sharing item listings, and/or purchasing certain items.

As further shown in FIG. 2, a machine learning model 222 is generated using information in the complementary item listings datastore 220. In particular, user behavior information regarding user interactions with item listings from multi-target searches is used as training data to train the machine learning model 222 to predict complementary item listings given input item listings.

Referring again to FIG. 1, complementary object information from the complementary objects datastore 116, complementary item listing information from the complementary item listings datastore 120, and/or the machine learning model 134 can be used by the recommendation module 136 to identify complementary item listings for one or more input item listings and provide recommendations (e.g., item listing recommendations and/or query suggestions) based on the complementary item listings. One or more input item listings may be received in any of a number of different scenarios. For instance, in some instances, an input item listing may be received in response to a potential buyer selecting to view the input item listing (e.g., from browsing, searching, etc.) or the potential buyer purchasing an item for the input item listing. In some instances, multiple input item listings are received based on historical user interactions with the item listings by the potential buyer. In other instances, an input item listing may be received when a seller of the item for the input item listing generates, modifies, or otherwise views the input item listing.

Given an input item listing, the complementary object component 136 identifies an object of the input item listing. The object may comprise an image of the item offered by the item listing. For instance, for an item listing offering a sofa, one or more images of the sofa can be obtained from the item listing. Using the one or more images from the item listing, the complementary object component 136 searches the complementary objects datastore 116 to identifying complementary objects for the object of the input item listing. This may comprise using the one or more images from the item listing to identify one or more similar objects in the complementary objects datastore 116 and to identify one or more complementary objects associated with each of the similar objects based on complementary object information in the complement object datastore 116. For instance, in the example in which a sofa is the object for an item listing, an image of the sofa from the item listing is used to search the complementary objects datastore 116 to identify similar sofas. Objects associated with those similar sofas in the complementary objects datastore 116 (e.g., chairs, coffee tables, etc.) are then returned as complementary objects for the sofa from the input item listing.

Given complementary objects identified from the complementary objects datastore 116, the recommendation search component 138 performs a search on the item listings datastore 120 to identify a set of item listings corresponding with the complementary objects. The recommendation search component 138 may operate similarly to the object search component 126 to identify item listings from the item listing datastore 120 for a given object. In the case of the recommendation search component 138, a search may be performed for each complementary object identified from the complementary objects datastore 116 based on the object from the input item listing. For a given complementary object, the recommendation search component 138 may perform a search on the item listings datastore 120 to identify item listings with objects similar to the given complementary object. This may comprise, at least in part, an image-based search in which objects from item listings that are visually similar to the given complementary object are identified. However, other information such as text and metadata may be used in conjunction with the image of the given complementary object. For instance, the complementary objects datastore 116 may store additional metadata with each object, such a label classifying each object. As such, the label or other metadata can be used by the recommendation search component 138 to assist in identifying item listings for a given complementary object.

The complementary item listings component 140 identifies another set of complementary item listings for an input item listing using complementary item listing information from the complementary item listings datastore 118. In particular, the complementary item listings component 140 uses the input item listing to perform a search on the complementary item listings datastore 118 to identify complementary item listing information for the input item listing. The complementary item listing information identifies specific complementary item listings for the input item listing, thereby providing another set of complementary item listings.

The model inference component 142 uses the machine learning model 134 to identify complementary item listings for an input item listing. As noted above, the machine learning model 134 is trained on user behavior information from multi-target search to predict complementary item listings. The model inference component 142 provides an input item listing as input to the machine learning model 134, which predicts complementary item listings for the input item listing, thereby providing a further set of complementary item listings.

The recommendation component 144 provides item listing recommendations based on complementary item listings for one or more input item listings. As described above, components of the recommendation module 136 can determine complementary item listings for one or more input item listings using complementary object information from the complementary objects datastore 116, complementary item listing information from the complementary item listings datastore 118, and/or the machine learning model 134. The complementary item listings identified via one or more of these sources can be merged by the recommendation component 144 and presented as item listing recommendations to a user.

Merging the complementary item listings to provide a set of item listing recommendations can comprise a variety of different processes. In some cases, the complementary item listings may be deduped to remove redundant complementary item listings. In some cases, the complementary item listings may be ranked on any combination of different factors, such as for instance, historical user behavior information for the user to which the item listing recommendations are being provided, historical user behavior information across multiple users, relevance information indicative of relevance of complementary objects to an object from an input item listing, relevance information indicative of relevance of item listings to complementary objects, and/or relevance information indicative of relevance of complementary item listings to an input item listing. In the case of providing item listing recommendations to a seller, the complementary item listings may be filtered to include only item listings offered by the seller. It should be understood that the merging approaches discussed herein are provided by way of example only, and other techniques may be employed to select one or more item listing recommendations given a number of complementary item listings identified for one or more input images.

The query suggestion component 146 provides query suggestions to a user based on complementary objects and complementary item listings for one or more input item listings the use has interacted with. The query suggestions can be based on an item listing the user is currently viewing and/or one or more item listings the user has interacted with previously. Given one or more input item listings, complementary objects determined by the complementary object component 136 can be used to derive query suggestions. In some cases, the query suggestions may be text-based, and the query suggestions can be derived based on text associated with the complementary objects (e.g., labels and metadata associated with the objects) and/or by analyzing the objects to determine text based on visual aspects of the objects (e.g., color, size, etc.). In some cases, the query suggestions may be image-based, and the query suggestions may be images associated with the complementary objects.

Query suggestions can also be based on complementary item listings determined by the complementary item listings component 140 and/or the model inference component 142. In instances in which the query suggestions are text-based, the query suggestions may be determined based on text from the complementary item listings. In instances in which the query suggestions are image-based, the query suggestions may be images from the complementary item listings.

The query suggestion component 146 can merge query suggestions from the various sources. This may include deduping to remove redundancies. This may also include ranking the query suggestions based on any number of factors. In some cases, the query suggestions are ranked based on the complementary objects and/or complementary item listings from which they were derived. For instance, the queries may be ranked on any combination of different factors, such as for instance, historical user behavior information for the user to which the query suggestions are being provided, historical user behavior information across multiple users, relevance information indicative of relevance of complementary objects to an object from an input item listing, and/or relevance information indicative of relevance of complementary item listings to an input item listing.

Figure 3:
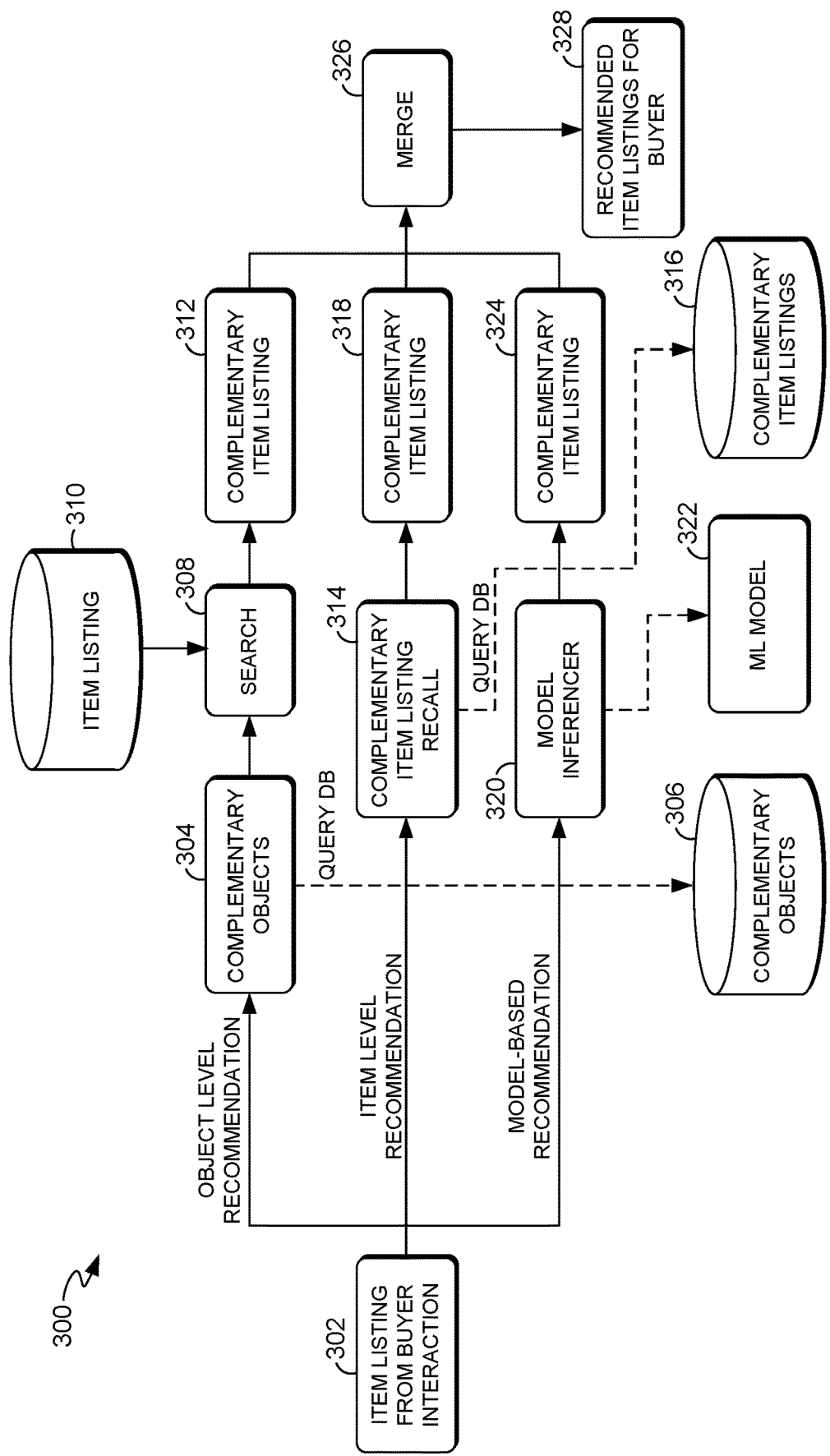
FIG. 3 is a block diagram illustrating an example process of using complementary object information and complementary item listing information obtained from multi-target search to identify item listing recommendations for a potential buyer in accordance with some implementations of the present disclosure.

FIG. 3 provides a block diagram illustrating a process 300 of using complementary object information and complementary item listing information obtained from multi-target search to identify item listing recommendations for a potential buyer. As shown in FIG. 3, at least one item listing 302 is received by the process 300 based on one or more user interactions with the item listing 302 by the potential buyer. In some cases, a single item listing 302 is received. For instance, a single item listing 302 may be received when the potential buyer selects the item listing 302 (e.g., via either browsing or a search result) to view a page for the item listing. In such cases, the complementary item listings determined by the process 300 may be ones with which the user may have interest since they offer items complementary to the item of the item listing 302 the user selected to view. In other instances, several item listings 302 are received by the process 300. For instance, historical user interaction information may be received that provides information regarding the potential buyer's interactions with multiple item listings 302. For instance, the item listings 302 may be ones the potential buyer has previously viewed, added to a watch/wish list, placed in a cart, or purchased. In such cases, the history of the potential buyer's interactions with various item listings 302 impact the item listing recommendations determined by the process 300. In some cases, the item listings 302 may include a currently viewed item listing, as well as item listings identified from historical user interaction information for the potential buyer.

The process 300 shows three approaches for identifying item listing recommendations based on the item listing(s) 302. It should be understood that various aspects of the technology described herein may employ any combination of the three approaches (e.g., a single approach, a combination of two of the approaches, combination of all three approaches). Additionally, while the following description discusses performing each approach for a single input item listing, it should be understood that each approach can be performed for each input item listing when multiple input item listings are received.

The first approach of the process 300, object-level recommendation, uses complementary object information to identify complementary item listings. As shown in FIG. 3, complementary objects 304 are identified by querying a complementary objects datastore 306. In particular, an image of the item offered by the item listing 302 is used to search the complementary objects datastore 306 to identify a similar object. Complementary objects associated with that similar object in the complementary objects datastore 306 are returned as the complementary objects 304. For instance, if the item listing 302 from the buyer interaction is for a sofa, an image of the sofa from the item listing 302 is used to identify a similar sofa in the complementary objects datastore 306, and complementary objects associated with that sofa, such as a chair and a coffee table, are identified from the complementary objects datastore 306 and returned as the complementary objects 304. The complementary objects 304 are then used to search 308 an item listings datastore 310. This may comprise an image-based search in which each complementary object 304 is used as an image query to identify item listings with items similar to each complementary object 304. The search 308 provides a first set of complementary item listings 312.

The second approach of process 300, item-level recommendation, uses complementary item listing information to identify complementary item listings. As shown in FIG. 3, complementary item listing recall 314 is performed by querying the complementary item listings datastore 316 using the item listing 302. The complementary item listings datastore 316 stores complementary item listing information that is used to identify complementary item listings for the item listing 302, which are provided as a second set of complementary item listings 318.

The third approach of process 300, model-based recommendation, uses a machine learning model 322 to predict complementary item listings. The machine learning model 322 may have been trained on user behavior data associated with search results from multi-target image search. A model inferencer 320 provides the item listing 302 as input to the machine learning model 322. Given this input, the machine learning model 322 predicts a third set of complementary item listings 324.

The sets of complementary item listings 312, 318, 324 are merged 326 to provide a set of one or more item listing recommendations 328, which is presented to the potential buyer. The process of merging the complementary item listings 312, 318, 324 may include a variety of different processes. In some cases, the complementary item listings may be deduped and ranked. The complementary item listings may be ranked on any combination of different factors, such as for instance, historical user behavior information for the user to which the item listing recommendations are being provided, historical user behavior information across multiple users, relevance information indicative of relevance of complementary objects to an object from an input item listing, relevance information indicative of relevance of item listings to complementary objects, and/or relevance information indicative of relevance of complementary item listings to an input item listing.

The one or more item listing recommendations identified from this process can be presented to the potential buyer in a number of different locations. For instance, one or more item listing recommendations can be presented on a page for an item listing being view by the potential buyer. As another example, one or more item listing recommendations can be based on the potential buyer's historical user interactions with different item listings, and the one or more item listing recommendations can be presented on a home page or other location when the potential buyer accesses the listing platform.

Figure 4:
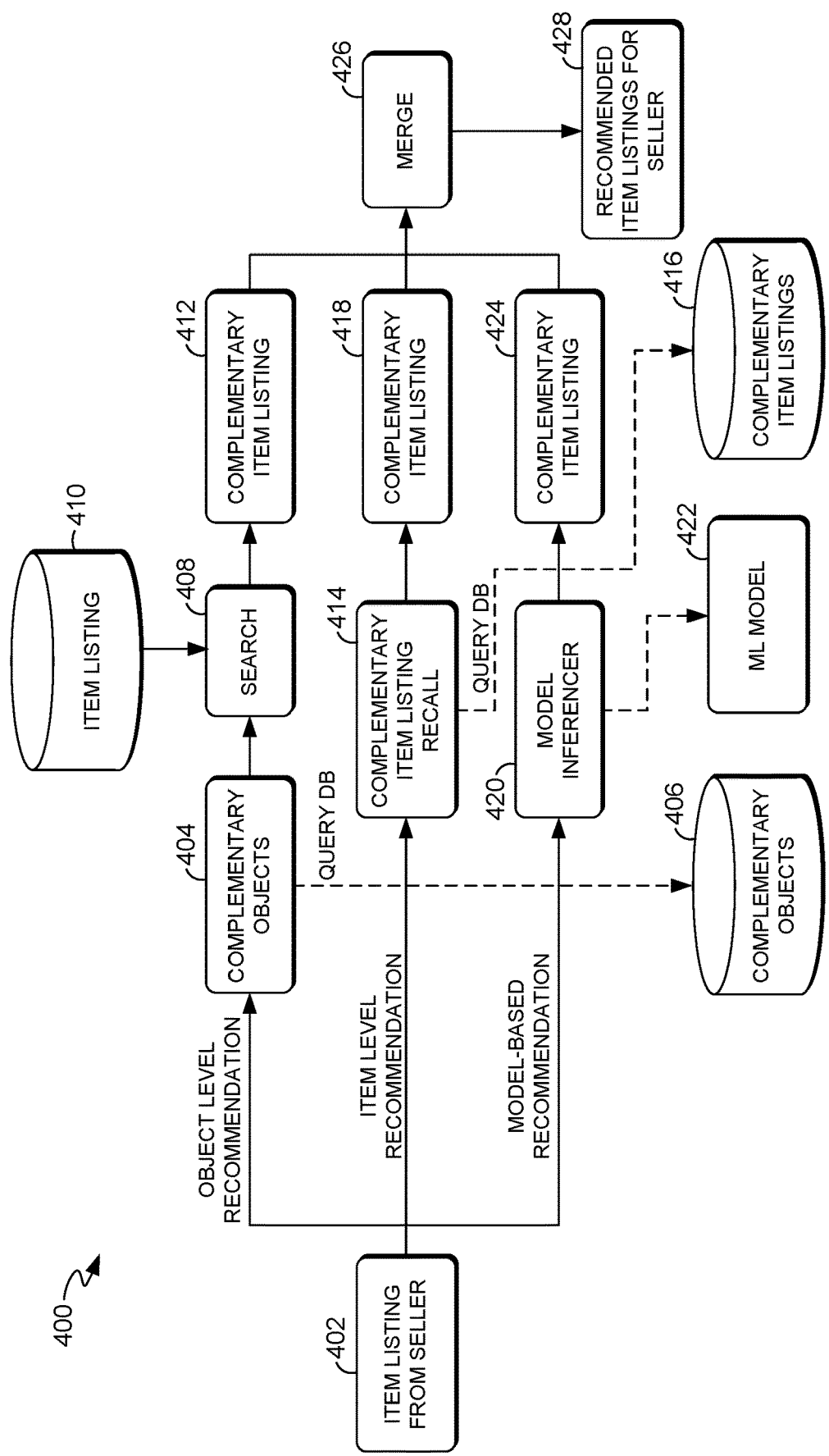
FIG. 4 is a block diagram illustrating an example process of using complementary object information and complementary item listing information obtained from multi-target search to identify complementary item listings for a seller in accordance with some implementations of the present disclosure.

FIG. 4 provides a block diagram illustrating a process 400 of using complementary object information and complementary item listing information obtained from multi-target search to identify item listing recommendations for a seller providing an item listing. This may be useful to the seller, for instance, to identify complementary item listings that can be bundled/recommended together. As shown in FIG. 4, at least one item listing 402 from a seller is received by the process 400.

Similar to the process 300, the process 400 shows three approaches for identifying item listing recommendations based on the item listing(s) 402. It should be understood that various aspects of the technology described herein may employ any combination of the three approaches (e.g., a single approach, a combination of two of the approaches, combination of all three approaches). Additionally, while the following description discusses performing each approach for a single input item listing, it should be understood that each approach can be performed for each input item listing when multiple input item listings are received.

The first approach of the process 400, object-level recommendation, uses complementary object information to identify complementary item listings. Complementary objects 404 are identified by querying a complementary objects datastore 406. In particular, an image of the item offered by the item listing 402 is used to search the complementary objects datastore 406 to identify a similar object. Complementary objects associated with that similar object in the complementary objects datastore 406 are returned as the complementary objects 404. For instance, if the item listing 402 from the seller is for a sofa, an image of the sofa from the item listing is used to identify a similar sofa in the complementary objects datastore 406, and complementary objects associated with that sofa, such as a chair and a coffee table, are identified from the complementary objects datastore 406 and returned as the complementary objects 404. The complementary objects 404 are then used to search 408 an item listings datastore 410. This may comprise an image-based search in which each complementary object 404 is used an image query to identify item listings with items similar to each complementary object 404. The search 408 provides a first set of complementary item listings 412. In some configurations, the search 408 is limited to only item listings from the seller. In some configurations, the search 408 is not limited to only item listings from the seller, and the complementary item listings 412 may be filtered to include only item listings from the seller.

The second approach of process 400, item-level recommendation, uses complementary item listing information to identify complementary item listings. As shown in FIG. 4, complementary item listing recall 414 is performed by querying the complementary item listings datastore 416 using the item listing 402. The complementary item listings datastore 416 stores complementary item listing information that is used to identify complementary item listings for the item listing 402, which are provided as a second set of complementary item listings 418. In some configurations, the item listing recall 414 is limited to only item listings from the seller. In some configurations, the item listing recall 414 is not limited to only item listings from the seller, and the complementary item listings 418 may be filtered to include only item listings from the seller.

The third approach of process 400, model-based recommendation, uses a machine learning model 422 to predict complementary item listings. The machine learning model 422 may have been trained on user behavior data associated with search results from multi-target image search. A model inferencer 420 provides the item listing 402 as input to the machine learning model 422. Given this input, the machine learning model 422 predicts a third set of complementary item listings 424. In some configurations, the machine learning model 422 is configured to only return item listings from the seller. In some configurations, the machine learning model 422 is configured to return item listings regardless of seller, and the complementary item listings 424 may be filtered to include only item listings from the seller.

The sets of complementary item listings 412, 418, 424 are merged 426 to provide a set of one or more item listing recommendations 428, which is presented to the seller or otherwise selected for inclusion with an item listing from the seller. The process of merging the complementary item listings 412, 418, 424 may include a variety of different processes. In some cases, the complementary item listings may be deduped and ranked. The complementary item listings may be ranked on any combination of different factors, such as for instance, historical user behavior information for the user to which the item listing recommendations are being provided, historical user behavior information across multiple users, relevance information indicative of relevance of complementary objects to an object from an input item listing, relevance information indicative of relevance of item listings to complementary objects, and/or relevance information indicative of relevance of complementary item listings to an input item listing. In some cases in which the item listing recommendations are to be limited to item listings from the seller, if not already done so, the merge 426 process can include filtering the complementary item listings to include only item listings offered by the seller.

Figure 5:
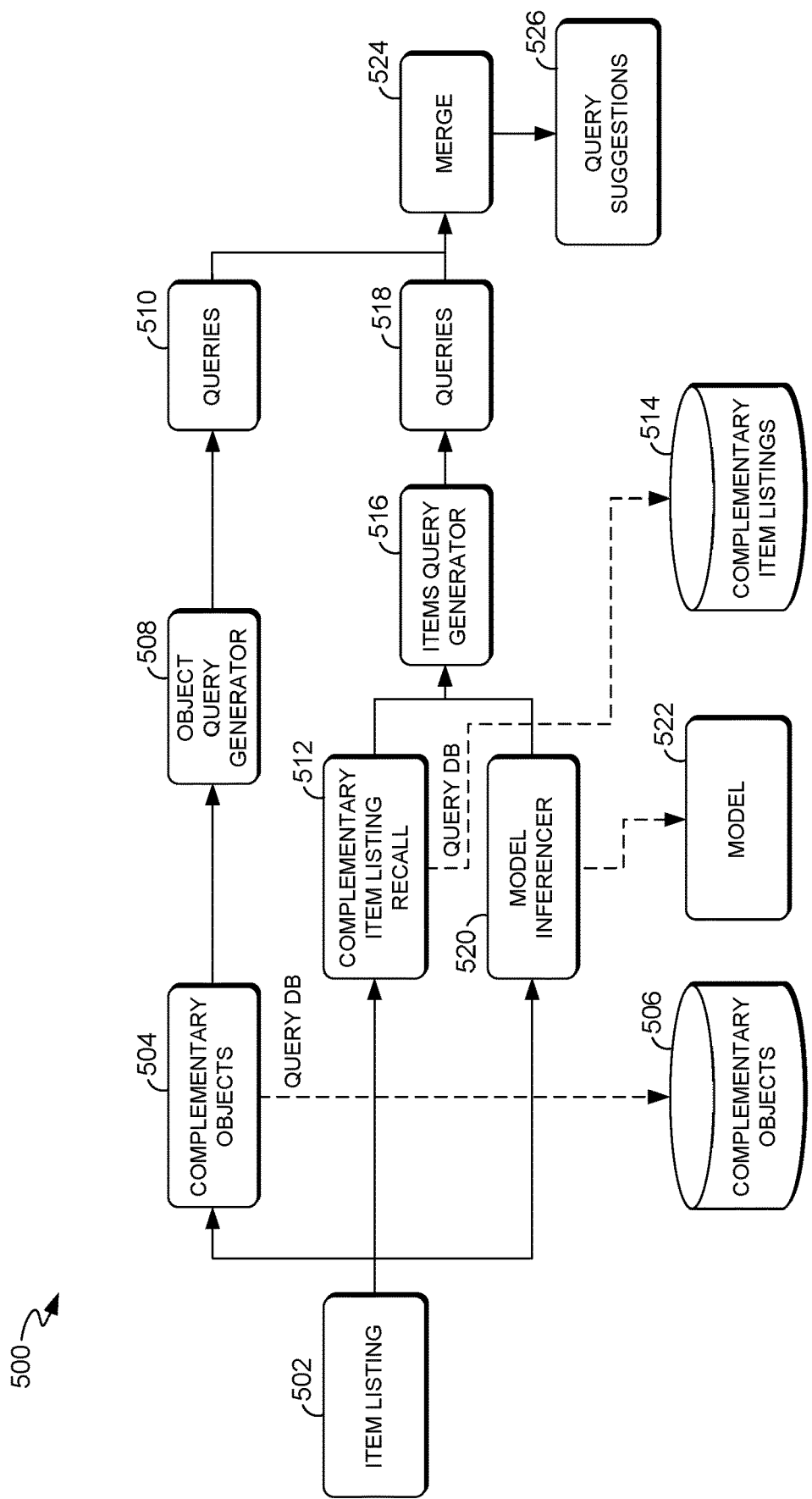
FIG. 5 is a block diagram showing an example process of using complementary object information and complementary item listing information obtained from multi-target search to provide query suggestions in accordance with some implementations of the present disclosure.

FIG. 5 provides a block diagram illustrating a process 500 of using complementary object information and complementary item listing information obtained from multi-target search to generate query suggestions. As shown in FIG. 5, at least one item listing 502 is received by the process 500. This could include, for instance, an item listing currently being viewed by a user and/or one or more item listings the user has interacted with as reflected by historical user interaction data for the user.

Similar to the processes 300, 400 for identifying item listing recommendations, the process 500 shows three approaches for identifying query suggestions based on the item listing(s) 502. It should be understood that various aspects of the technology described herein may employ any combination of the three approaches (e.g., a single approach, a combination of two of the approaches, combination of all three approaches). Additionally, while the following description discusses performing each approach for a single input item listing, it should be understood that each approach can be performed for each input item listing when multiple input item listings are received.

The first approach of the process 500, object-level recommendation, uses complementary object information to identify query suggestions. Complementary objects 504 are identified by querying a complementary objects datastore 506. In particular, an image of the item offered by the item listing 502 is used to search the complementary objects datastore 506 to identify a similar object. Complementary objects associated with that similar object in the complementary objects datastore 506 are returned as the complementary objects 504. The complementary objects 504 are used by an object query generator 508 to generate one or more queries 510. The queries 510 may be determined by the object query generator 508 based on the complementary objects 504 in a number of different ways. In some instances, the queries 510 may be text-based. In such instances, one or more labels or other metadata may be associated with each complementary object in the complementary object datastore 506. For instance, a label could identify a complementary object as being a particular type of object, and the queries 510 can include terms based on the label. Metadata describing attributes of the object (e.g., color, size, etc.) could also be used to generated terms for the queries 510. In some cases, the queries 510 may be image-based. In such instance, the queries 510 can include images of the complementary objects.

The second approach of process 500, item-level recommendation, uses complementary item listing information to identify query suggestions. As shown in FIG. 5, complementary item listing recall 512 is performed by querying the complementary item listings datastore 514 using the item listing 502. The complementary item listings datastore 514 stores complementary item listing information that is used to identify complementary item listings, which are used by an item query generator 516 to generate one or more queries 518. The queries 518 may be determined by the item query generator 516 based on the complementary item listings from the complementary item listings datastore 514 in a number of different ways. In some instances, the queries 518 may be text-based. In such instances, text from the complementary item listings can be used to select terms for the queries 518. In some cases, the queries 518 may be image-based. In such instance, the queries 518 can include images from the complementary item listings.

The third approach of process 500, model-based recommendation, uses a machine learning model 522 to predict complementary item listings. The machine learning model 522 may have been trained on user behavior data associated with search results from multi-target image search. A model inferencer 520 provides the item listing 502 as input to the machine learning model 522. Given this input, the machine learning model 522 predicts a complementary item listings, which are used by an item query generator 516 to generate the one or more queries 518. The queries 518 may be determined by the item query generator 516 based on the complementary item listings determined using the model 522 in a number of different ways. In some instances, the queries 518 may be text-based. In such instances, text from the complementary item listings can be used to select terms for the queries 518. In some cases, the queries 518 may be image-based. In such instance, the queries 518 can include images from the complementary item listings. In some configurations, the complementary item listings from the item-level recommendation may be combined with the complementary item listings from the model-based recommendation and deduped before the combined complementary item listings are processed by the item query generator 516 to provide the queries 518.

The queries 510, 518 are merged 524 to provide a set of query suggestions 526. The process of merging the queries 510, 518 may include any of a variety of techniques. For instance, the queries 510, 518 may be deduped to remove redundant queries. The queries 510, 518 may also be ranked based on any number of factors. In some cases, the queries 510, 518 are ranked based on the complementary objects and/or complementary item listings from which they were derived. For instance, the queries 510, 518 may be ranked on any combination of different factors, such as for instance, historical user behavior information for the user to which the query suggestions are being provided, historical user behavior information across multiple users, relevance information indicative of relevance of complementary objects to an object from an input item listing, and/or relevance information indicative of relevance of complementary item listings to an input item listing.

Example Methods for Complementary Item Recommendation

Figure 6:
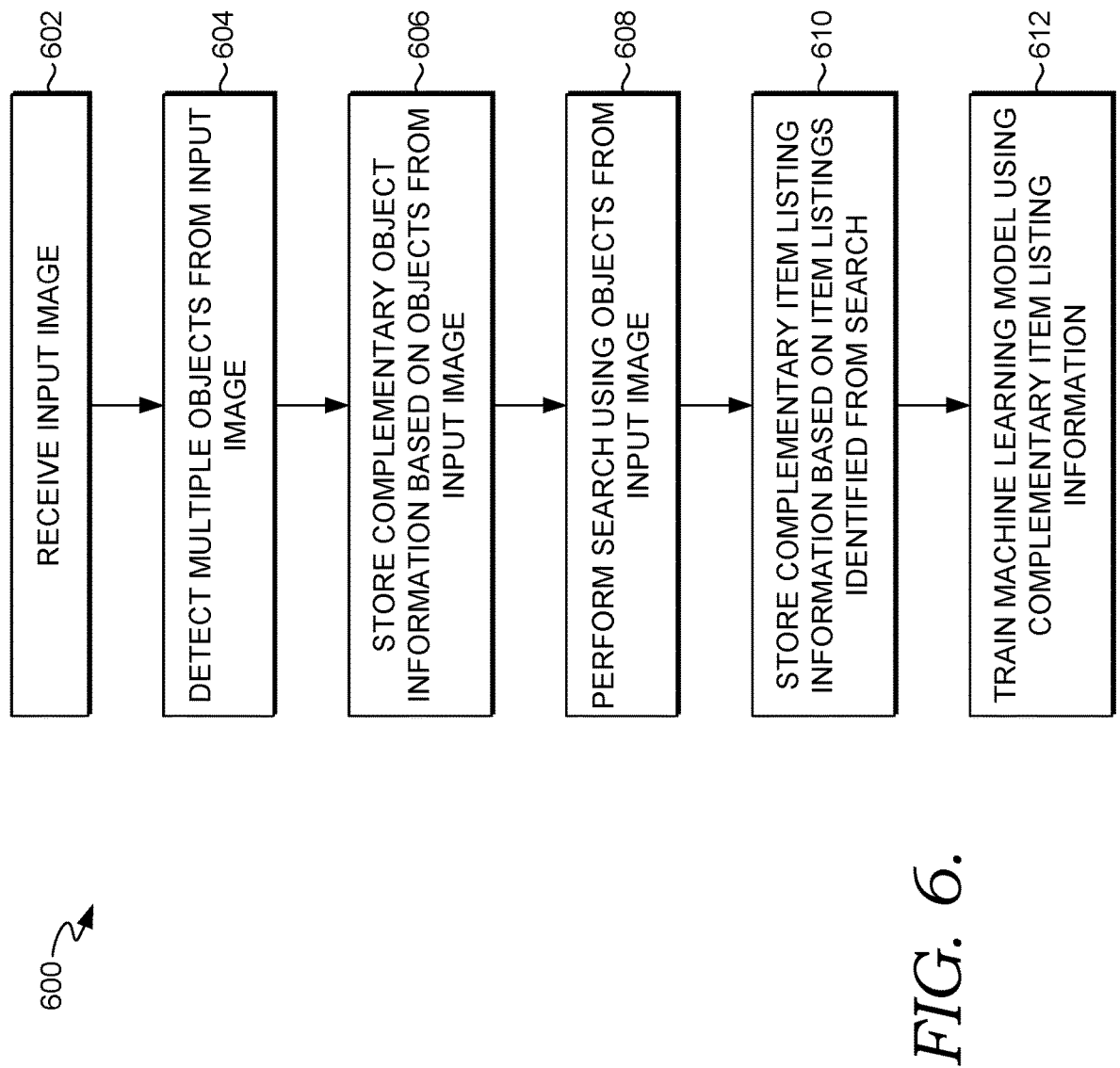
FIG. 6 is a flow diagram showing a method for using multi-target search to generate complementary object information and complementary item listing information in accordance with some implementations of the present disclosure.

With reference now to FIG. 6, a flow diagram is provided that illustrates a method 600 for using multi-target search to generate complementary object information and complementary item listing information. The method 600 may be performed, for instance, by the recommendation system 104 of FIG. 1. Each block of the method 600 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 602, an input image is received. The image may include a number of different objects. For instance, the input image may include a sofa, chair, and coffee table. Object detection is performed on the input image to detect each object in the image, as shown at block 604. For instance, the object detection may identify the sofa, chair, and coffee table in the input image as separate objects.

Complementary object information is stored (e.g., in a complementary objects datastore) based on the objects detected from the input image, as shown at block 606. The complementary object information identifies one object as being complementary of another object. For instance, complementary object information may associate an image portion containing the sofa from the input image (or other representation of the sofa) with an image portion containing the chair from the input image (or other representation of the chair).

As shown at block 608, a search is performed on an item listing datastore using each object identified from the input image. The search returns one or more item listings as search results for each object. For instance, item listings for sofas similar to the sofa in the input image could be returned for the sofa object, while item listings for chairs similar to the chair in the input image could be returned for the chair object.

Complementary item listing information is stored (e.g., in a complementary item listings datastore) based on the item listings identified from the search, as shown at block 610. The complementary item listing information includes information identifying one item listings as being complementary to another item listing. In some instances, complementary item listing information may be generated and stored based on two item listings being returned as search results. For instance, a sofa item listing included in search results for the sofa object could be identified as complementary to a chair item listing included in search results for the chair object. In some instances, complementary item listing information may be generated and stored based on some threshold level user interaction with two item listings. For instance, a sofa item listing included in search results for the sofa object could be identified as complementary to a chair item listing included in search results for the chair object if the user selected to view each item listing and/or performed some other threshold user interaction with each item listing (e.g., viewed for a certain period of time or purchased).

As shown at block 612, a machine learning model is also generated using complementary item listing information. The complementary item listing information may include information identifying complementary item listings. Additionally, the machine learning model may be trained based on user behavior information regarding specific user interaction with item listings.

Figure 7:
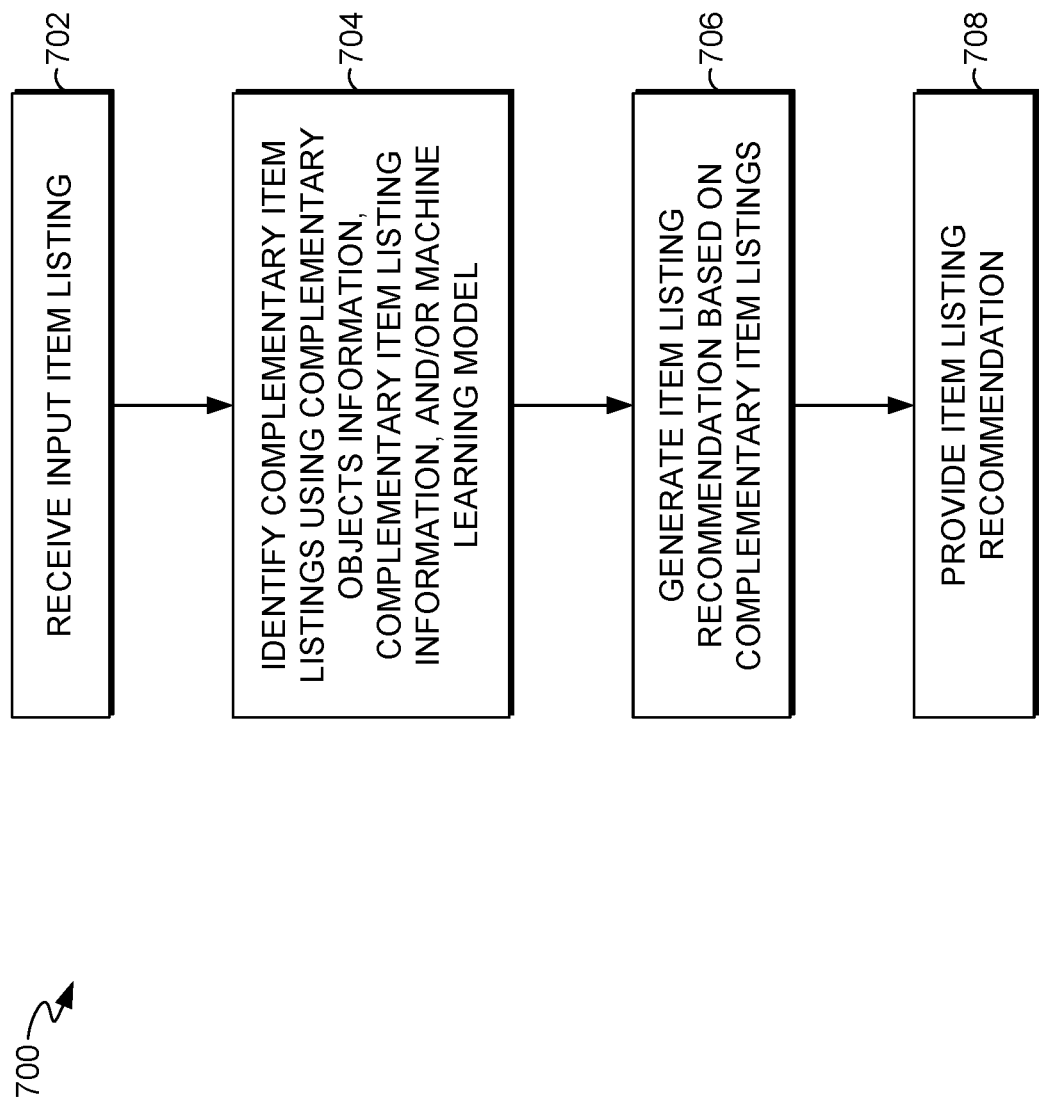
FIG. 7 is a flow diagram showing a method for providing item listing recommendations using complementary object information and/or complementary item listing information in accordance with some implementations of the present disclosure.

FIG. 7 is a flow diagram showing a method 700 for providing item listing recommendations using complementary object information and/or complementary item listing information. As shown at block 702, an input item listing is received. Although a single input item listing is described for FIG. 7, it should be understood that multiple input item listings may be received, and the method 700 performed on the collection of input item listings. The input item listing may be received from a potential buyer or from a seller listing the input item listing.

Complementary item listings for the input item listing are determined using complementary object information, complementary item listing information, and/or a machine learning model, as shown at block 704. In the case of complementary object information, one or more images from the input item listing are used to identify one or more similar objects in the complementary object information, and complementary objects are identified from those similar objects from the complementary object information. For instance, if the input item listing is for a sofa, an image of the sofa may be used to identify similar sofas in the complementary object information and complementary objects, such as chairs, identified as being complementary to the similar sofas may be returned. A search is then performed on an item listing datastore using the complementary objects to identify complementary item listings.

In the case of complementary item listing information, the input item listing can be used to lookup complementary item listing information for the item listing. The complementary item listing information may identify item listings that have been determined to be complementary to the input item listing.

In the case of a machine learning model, the model has been trained to predict complementary item listings for an item listing. Accordingly, the input item listing may be provided as input to the machine learning model, which predicts complementary item listings for the input item listing.

As shown at block 706, one or more item listing recommendations are generated. The item listing recommendation(s) may be based on the complementary item listings determined from the complementary object information, the complementary item listing information, and/or the machine learning model, as discussed above for block 704. If multiple sources are used, the complementary item listings identified may be merged to identify the item listing recommendation(s). This may include deduping and/or ranking complementary item listings. In instances in which item listing recommendations are being provided to a seller listing the input item listing, the complementary item listings may be limited to item listings offered by the seller. The item listing recommendations are provided for presentation, as shown at block 708.

Figure 8:
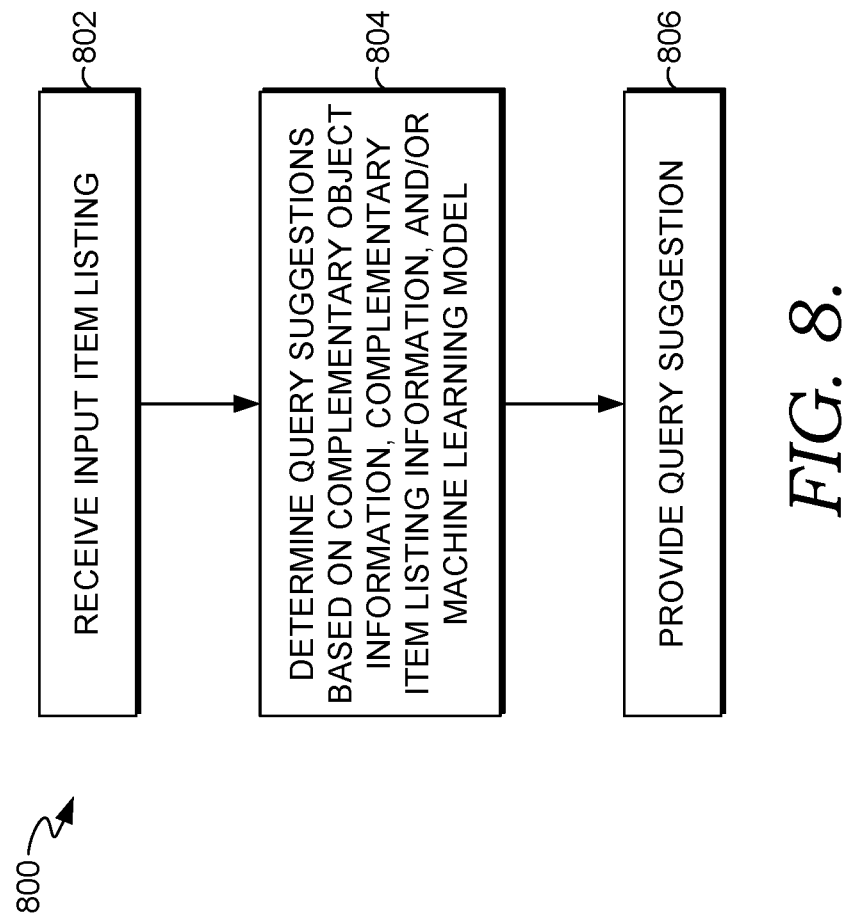
FIG. 8 is a flow diagram showing a method for providing query suggestions using complementary object information and/or complementary item listing information in accordance with some implementations of the present disclosure.

FIG. 8 is a flow diagram showing a method 800 for providing query suggestions using complementary object information and/or complementary item listing information. As shown at block 802, an input item listing is received. Although a single input item listing is described for FIG. 8, it should be understood that multiple input item listings may be received, and the method 800 performed on the collection of input item listings.

Query suggestions are determined based on complementary object information, complementary item listing information, and/or a machine learning model, as shown at block 804. In the case of complementary object information, one or more images from the input item listing are used to identify one or more similar objects in the complementary object information, and complementary objects are identified from those similar objects from the complementary object information. Queries are determined based on those complementary objects.

In the case of complementary item listing information, the input item listing can be used to lookup complementary item listing information for the item listing. The complementary item listing information may identify item listings that have been determined to be complementary to the input item listing. Queries are determined based on those complementary item listings.

In the case of a machine learning model, the model has been trained to predict complementary item listings for an item listing. Accordingly, the input item listing may be provided as input to the machine learning model, which predicts complementary item listings for the input item listing. Queries are determined based on those complementary item listings.

As shown at block 806, one or more item query suggestions are provided. The query suggestion(s) may be based on the queries determined from the complementary object information, the complementary item listing information, and/or the machine learning model, as discussed above for block 804. If multiple sources are used, the identified queries may be merged to identify the query suggestion(s). This may include deduping and/or ranking queries from the sources.

Exemplary Operating Environment

Figure 9:
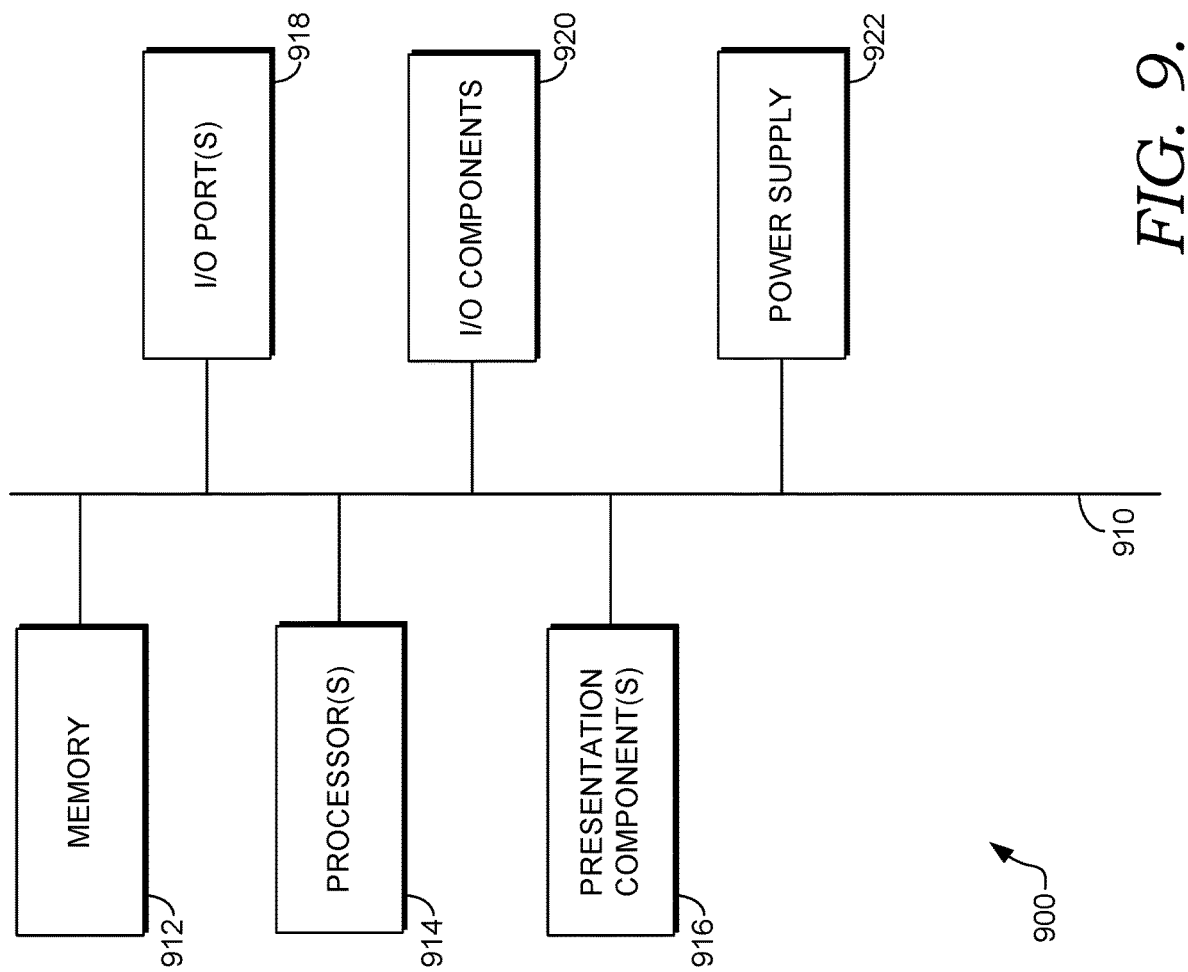
FIG. 9 is a block diagram of an exemplary computing environment suitable for use in implementations of the present disclosure.

Having described implementations of the present disclosure, an exemplary operating environment in which embodiments of the present technology may be implemented is described below in order to provide a general context for various aspects of the present disclosure. Referring initially to FIG. 9 in particular, an exemplary operating environment for implementing embodiments of the present technology is shown and designated generally as computing device 900. Computing device 900 is but one example of a suitable computing environment and is not intended to suggest any limitation as to the scope of use or functionality of the technology. Neither should the computing device 900 be interpreted as having any dependency or requirement relating to any one or combination of components illustrated.

The technology may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 9, computing device 900 includes bus 910 that directly or indirectly couples the following devices: memory 912, one or more processors 914, one or more presentation components 916, input/output (I/O) ports 918, input/output components 920, and illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 9 is merely illustrative of an exemplary computing device that can be used in connection with one or more embodiments of the present technology. Distinction is not made between such categories as "workstation," "server," "laptop," "handheld device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 900. The computing device 900 may be equipped with depth cameras, such as, stereoscopic camera systems, infrared camera systems, RGB camera systems, and combinations of these for gesture detection and recognition. Additionally, the computing device 900 may be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology may generally refer to the technical solution environment and the schematics described herein, it is understood that the techniques described may be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method comprising:
accessing a plurality of images at a search system of a listing platform, the search system comprising one or more servers and one or more storage devices;
generating a complementary object datastore on at least one storage device of the one or more storage devices of the search system, the complementary object datastore generated by:
for each image from the plurality of images, performing, by at least one server of the one or more servers, object detection on the image to identify each of a plurality of objects in the image, and
for each image from the plurality of images, storing, in the complementary objects datastore, complementary object data identifying a first object from the image and a second object from the image as complementary objects;
generating a complementary item listing datastore on at least one storage device of the one or more storage devices of the search system, the complimentary item listing datastore generated by:
for each image from the plurality of images, performing a multi-target search by at least one server from the one or more servers using each object in the image as a search query to query an item listings datastore on at least one storage device of the one or more storage devices using each object to identify a plurality of one or more item listings for each object in the image, and
for each image from the plurality of images, storing, in the complementary item listings datastore, complementary item listing data identifying the one or more item listings identified for a first object in the image and the one or more item listings identified for a second object in the image as complimentary item listings; and providing a webpage presenting at least one complimentary item listing recommendation for an input item listing using the complimentary object datastore and the complimentary item listings datastore by:

receiving, by at least one server of the one or more servers, an indication of the input item listing for which data is stored in the item listings datastore, querying the complementary object data in the complementary objects datastore using an object from the input item listing as a search query to identify one or more complementary objects, querying the item listings datastore using each of the one or more complementary objects as a search query to identify a first set of complementary item listings, querying the complementary item listings data in the complementary item listings datastore using the input item listing as a search query to identify a second set of complementary item listings, and providing the webpage presenting the at least one complimentary item listing recommendation based on the first set of complementary item listings and the second set of complementary item listings.

2. The computer-implemented method of claim 1, wherein the input item listing is received in response to a user interacting with the input item listing.

3. The computer-implemented method of claim 1, wherein the input item listing is received from a seller providing the input item listing.

4. The computer-implemented method of claim 1, wherein the complementary item listing data is stored based on user behavior information regarding user interaction with one or more item listings from the plurality of item listings.

5. The computer-implemented method of claim 1, wherein the method further comprises:

training, using the complementary item listing data from the complementary item listings datastore, a machine learning model to predict complementary item listings for a given item listing; and identifying, using the machine learning model, a third set of complementary item listings based on the input item listing, wherein the at least one complimentary item listing recommendation is further based on the third set of complementary item listings.

6. The computer-implemented method of claim 1, wherein the at least one complimentary item listing recommendation comprises one or more recommended complementary item listings from the first set of complementary item listings and/or the second set of complementary item listings.

7. One or more computer storage media storing computer-useable instructions that, when used by a computing device, cause the computing device to perform operations, the operations comprising:

accessing a plurality of images at a search system of a listing platform, the search system comprising one or more servers and one or more storage devices;

generating a complementary object datastore on at least one storage device of the one or more storage devices of the search system, the complementary object datastore generated by:

for each image from the plurality of images, performing, by at least one server of the one or more servers, object detection on the image to identify each of a plurality of objects in the image, and for each image from the plurality of images, storing, in the complementary objects datastore, complementary object data identifying a first object from the image and a second object from the image as complementary objects;

generating a complementary item listing datastore on at least one storage device of the one or more storage devices of the search system, the complimentary item listing datastore generated by:

for each image from the plurality of images, performing a multi-target search by at least one server from the one or more servers using each object in the image as a search query to query an item listings datastore on at least one storage device of the one or more storage devices to identify one or more item listings for each object in the image, and for each image from the plurality of images, storing, in the complementary item listings datastore, complementary item listing data associating identifying the one or more item listings identified for a first object in the image and the one or more item listings identified for a second object in the image as complimentary item listings from the plurality of item listings; and providing a webpage presenting at least one complimentary item listing recommendation for an input item listing using the complimentary object datastore and the complimentary item listings datastore by:

receiving, by at least one server of the one or more servers, an indication of the input item listing for which data is stored in the item listings datastore, querying the complementary object data in the complementary objects datastore using an object from the input item listing as a search query to identify one or more complementary objects, querying the item listings datastore using each of the one or more complementary objects as a search query to identify a first set of complementary item listings, querying the complementary item listings data in the complementary item listings datastore using the input item listing as a search query to identify a second set of complementary item listings, and providing the webpage presenting the at least one complimentary item listing recommendation based on the first set of complementary item listings and the second set of complementary item listings.

8. The computer storage media of claim 7, wherein the input item listing is received in response to a user interacting with the input item listing.

9. The computer storage media of claim 7, wherein the input item listing is received from a seller providing the input item listing.

10. The computer storage media of claim 7, wherein the complementary item listing data is stored based on user behavior information regarding user interaction with one or more item listings from the plurality of item listings.

11. The computer storage media of claim 7, wherein the operations further comprise:

training, using the complementary item listing data from the complementary item listings datastore, a machine learning model to predict complementary item listings for a given item listing; and identifying, using the machine learning model, a third set of complementary item listings based on the input item listing, wherein the at least one complimentary item listing recommendation is further based on the third set of complementary item listings.

12. The computer storage media of claim 7, wherein the at least one complimentary item listing recommendation comprises one or more recommended complementary item listings from the first set of complementary item listings and/or the second set of complementary item listings.

13. A computer system comprising:
a processor; and
a computer storage medium storing computer-useable instructions that, when used by the processor, causes the computer system to perform operations comprising:
accessing a plurality of images at a search system of a listing platform, the search system comprising one or more servers and one or more storage devices;
generating a complementary object datastore on at least one storage device of the one or more storage devices of the search system, the complementary object datastore generated by:
for each image from the plurality of images, performing, by at least one server of the one or more servers, object detection on the image to identify each of a plurality of objects in the image, and
for each image from the plurality of images, storing, in the complementary objects datastore, complementary object data identifying a first object from the image and a second object from the image as complementary objects;
generating a complementary item listing datastore on at least one storage device of the one or more storage devices of the search system, the complimentary item listing datastore generated by:
for each image from the plurality of images, performing a multi-target search by at least one server from the one or more servers using each object in the image as a search query to query an item listings datastore on at least one storage device of the one or more storage devices to identify one or more item listings for each object in the image, and
for each image from the plurality of images, storing, in the complementary item listings datastore, complementary item listing data identifying the one or more item listings identified for a first object in the image and the one or more item listings identified for a second object in the image as complimentary item listings; and providing a webpage presenting at least one complimentary item listing recommendation for an input item listing using the complementary object datastore and the complementary item listings datastore by:
receiving, by at least one server of the one or more servers, an indication of the input item listing for which data is stored in the item listings datastore,
querying the complementary object data in the complementary objects datastore using an object from the input item listing as a search query to identify one or more complementary objects,
querying the item listings datastore using each of the one or more complementary objects as a search query to identify a first set of complementary item listings,
querying the complementary item listings data in the complementary item listings datastore using the input item listing as a search query to identify a second set of complementary item listings, and
providing the webpage presenting the at least one complimentary item listing recommendation based on the first set of complementary item listings and the second set of complementary item listings.

14. The computer system of claim 13, wherein the input item listing is received in response to a user interacting with the input item listing.

15. The computer system of claim 13, wherein the complementary item listing data is stored based on user behavior information regarding user interaction with one or more item listings from the plurality of item listings.

16. The computer system of claim 13, wherein the operations further comprise:
training, using the complementary item listing data from the complementary item listings datastore, a machine learning model to predict complementary item listings for a given item listing; and
identifying, using the machine learning model, a third set of complementary item listings based on the input item listing, wherein the at least one complimentary item listing recommendation is further based on the third set of complementary item listings.

17. The computer system of claim 13, wherein the at least one complimentary item listing recommendation comprises one or more recommended complementary item listings from the first set of complementary item listings and/or the second set of complementary item listings.

* * * * *